United States Patent
Yamaguchi et al.

(10) Patent No.: US 9,809,187 B2
(45) Date of Patent: *Nov. 7, 2017

(54) PEDESTRIAN COLLISION DETECTION SENSOR-EQUIPPED VEHICLE BUMPER STRUCTURE

(71) Applicant: TOYOTA JIDOSHA KABUSHIKI KAISHA, Toyota-shi (JP)

(72) Inventors: Keiji Yamaguchi, Toyota (JP); Yasushi Nagaoka, Nisshin (JP); Naoya Higashimachi, Toyota (JP); Yusuke Mase, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/193,537

(22) Filed: Jun. 27, 2016

(65) Prior Publication Data

US 2017/0043735 A1 Feb. 16, 2017

(30) Foreign Application Priority Data

Aug. 10, 2015 (JP) ................. 2015-157960

(51) Int. Cl.
*B60R 19/18* (2006.01)
*B60R 19/48* (2006.01)

(52) U.S. Cl.
CPC ............ *B60R 19/483* (2013.01); *B60R 19/18* (2013.01); *B60R 2019/1873* (2013.01); *B60R 2019/1886* (2013.01)

(58) Field of Classification Search
CPC ....... B60R 19/48; B60R 19/483; B60R 19/44; B60R 21/0136; B60R 19/18;
(Continued)

(56) References Cited

U.S. PATENT DOCUMENTS 5,104,026 A 4/1992 Sturrus et al.
5,306,058 A 4/1994 Sturrus et al.
(Continued)

FOREIGN PATENT DOCUMENTS

CN 101048300 A 10/2007
CN 101258058 A 9/2008
(Continued)

OTHER PUBLICATIONS

Office Action dated Nov. 15, 2016, in co-pending U.S. Appl. No. 14/876,608.
(Continued)

*Primary Examiner* — Gregory Blankenship
(74) *Attorney, Agent, or Firm* — Oblon, McClelland, Maier & Neustadt, L.L.P.

(57) ABSTRACT

A vehicle bumper structure including: bumper reinforcement inside of a bumper cover provided at a front-rear direction outside end of a vehicle; an absorber disposed adjacent to the vehicle front-rear direction outside of the bumper reinforcement; a pedestrian collision detection sensor including a pressure tube extending between the bumper reinforcement and the absorber, bending toward a vehicle lower side at positions of both vehicle width direction end portions of the bumper reinforcement, including a left and right pair of tube end portions extending along a vehicle up-down direction, and outputting a signal according to a change in pressure in the pressure tube; and a reinforcement member, the reinforcement member being provided to a vehicle front-rear direction inside face of the bumper cover, reinforcing the bumper cover, and being disposed in a position superimposed in the vehicle front-rear direction on the tube end portion in plan view.

6 Claims, 8 Drawing Sheets

(58) Field of Classification Search
CPC ...... B60R 2019/1873; B60R 2019/188; B60R 21/01366
USPC ............ 293/102, 120–122, 132; 296/187.04, 296/187.09
See application file for complete search history.

(56) References Cited

U.S. PATENT DOCUMENTS

| | | | |
|---|---|---|---|
| 2006/0087132 A1 | 4/2006 | Tanabe | |
| 2007/0114803 A1 | 5/2007 | Takahashi et al. | |
| 2008/0122599 A1 | 5/2008 | Suzuki et al. | |
| 2009/0108598 A1* | 4/2009 | Takahashi | B60R 19/483 293/107 |
| 2009/0322107 A1 | 12/2009 | Takahashi et al. | |
| 2010/0038922 A1* | 2/2010 | Takahashi | B60R 19/483 293/117 |
| 2013/0013156 A1* | 1/2013 | Watanabe | B60R 21/0136 701/45 |
| 2013/0127190 A1* | 5/2013 | Shamoto | B60R 19/18 293/117 |
| 2014/0265445 A1* | 9/2014 | Leach | B60R 21/0136 296/187.04 |
| 2015/0274119 A1* | 10/2015 | Schondorf | B60R 19/483 293/132 |
| 2016/0039376 A1* | 2/2016 | Narita | B60R 19/483 293/4 |
| 2016/0101753 A1* | 4/2016 | Higashimachi | B60R 19/023 293/117 |
| 2016/0288750 A1* | 10/2016 | Nickel | B60R 19/483 |
| 2016/0347270 A1* | 12/2016 | Higashimachi | B60R 19/04 |
| 2017/0043735 A1* | 2/2017 | Yamaguchi | B60R 19/44 |

FOREIGN PATENT DOCUMENTS

| | | |
|---|---|---|
| CN | 102939222 A | 2/2013 |
| DE | 10 2010 000 224 A1 | 8/2010 |
| DE | 20 2011105 867 U1 | 10/2011 |
| EP | 2 559 597 A1 | 2/2013 |
| JP | 5-97007 A | 4/1993 |
| JP | 7-246894 A | 9/1995 |
| JP | 2005-186677 A | 7/2005 |
| JP | 2006-118982 A | 5/2006 |
| JP | 2007-69707 A | 3/2007 |
| JP | 2007-216804 A | 8/2007 |
| JP | 2011-245910 A | 12/2011 |
| JP | 2012-56452 | 3/2012 |
| JP | 2014-505629 | 3/2014 |
| JP | 2015-150906 A | 8/2015 |
| KR | 10-2008-0032253 A | 4/2008 |
| KR | 10-2014-0005290 A | 1/2014 |
| WO | WO 2011/128971 A1 | 10/2011 |
| WO | WO 2012/113362 A1 | 8/2012 |

OTHER PUBLICATIONS

Notice of Allowance and Fee(s) Due dated Apr. 12, 2017, in co-pending U.S. Appl. No. 14/876,608.
Extended European Search Report issued Feb. 24, 2016 in Patent Application No. 15188690.0.
Corrected Notice of Allowability dated Jul. 3, 2017 for co-pending U.S. Appl. No. 14/876,608.

\* cited by examiner

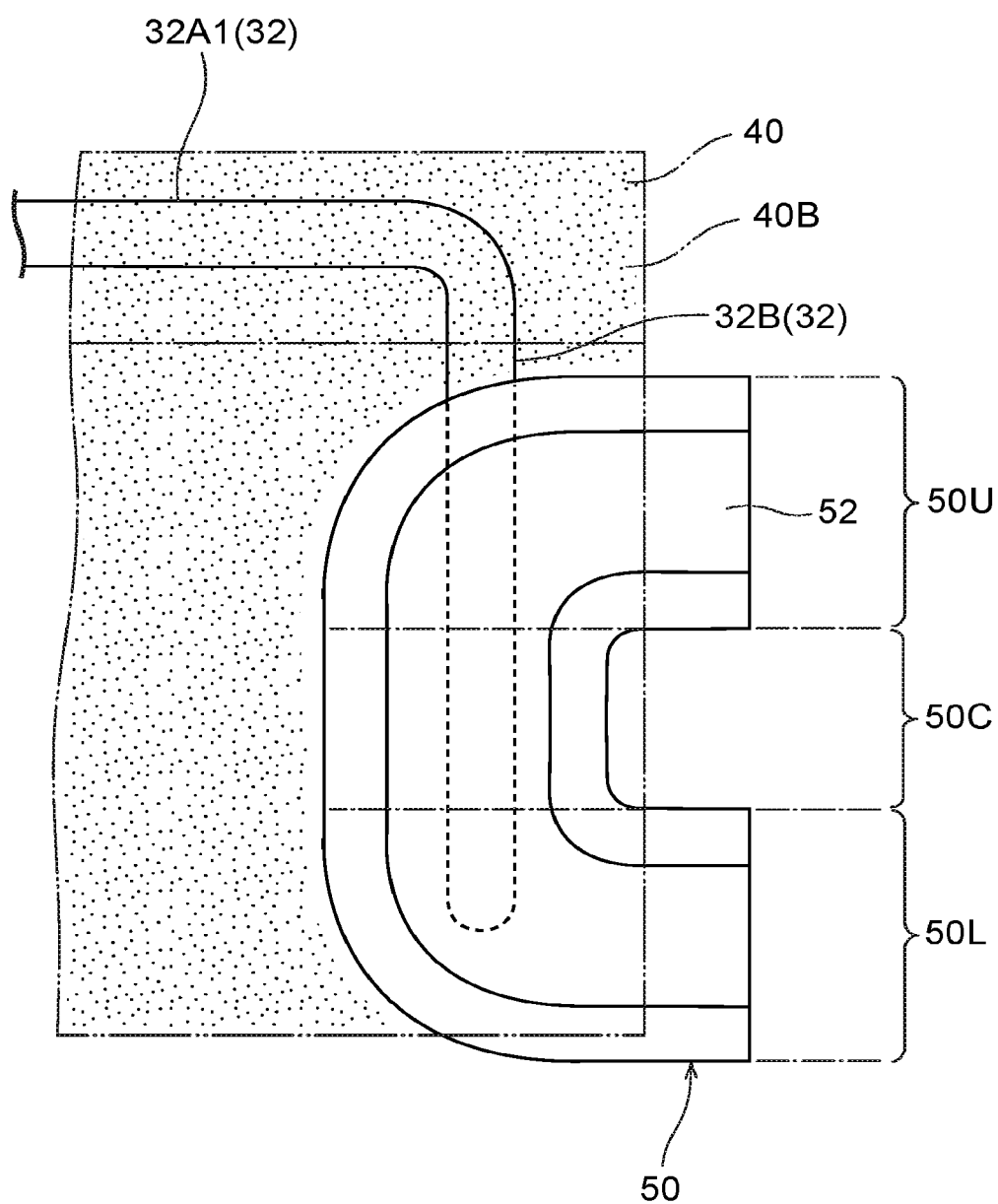

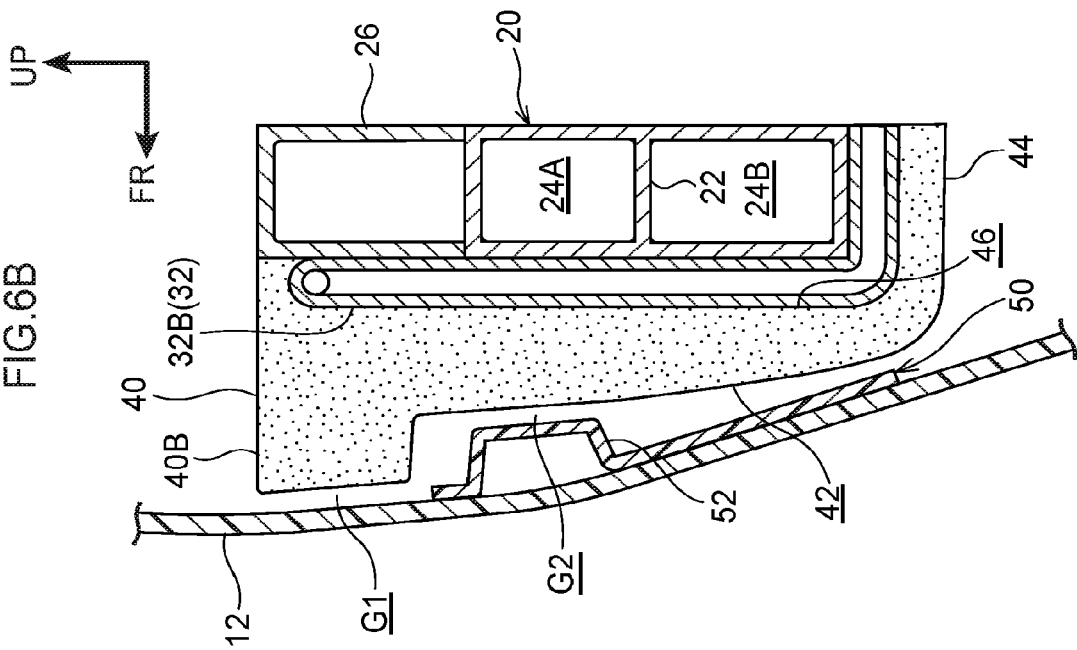
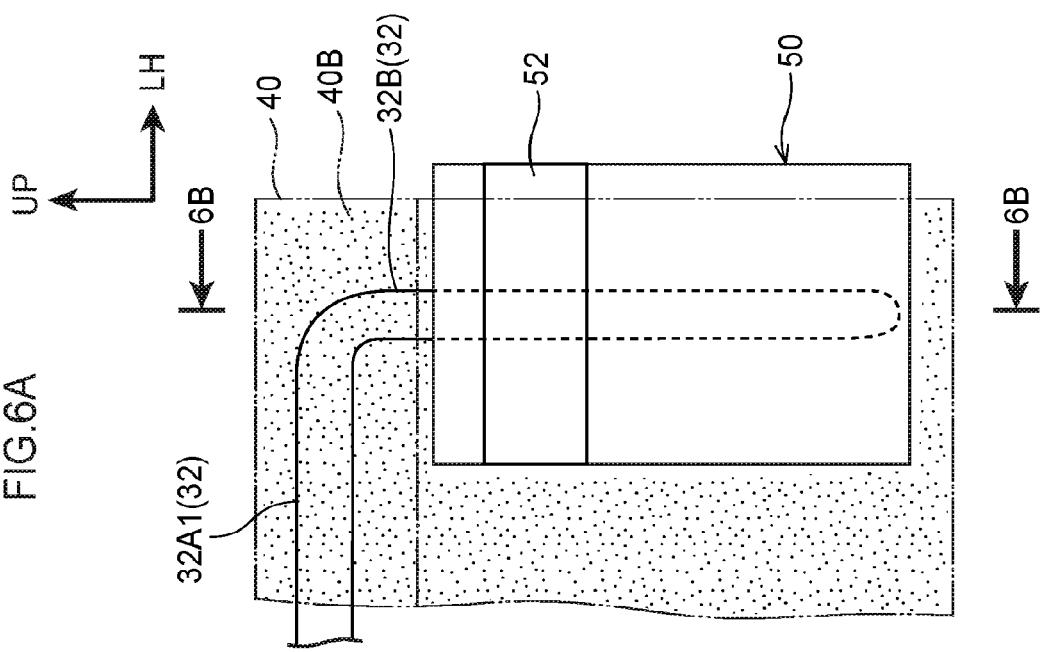

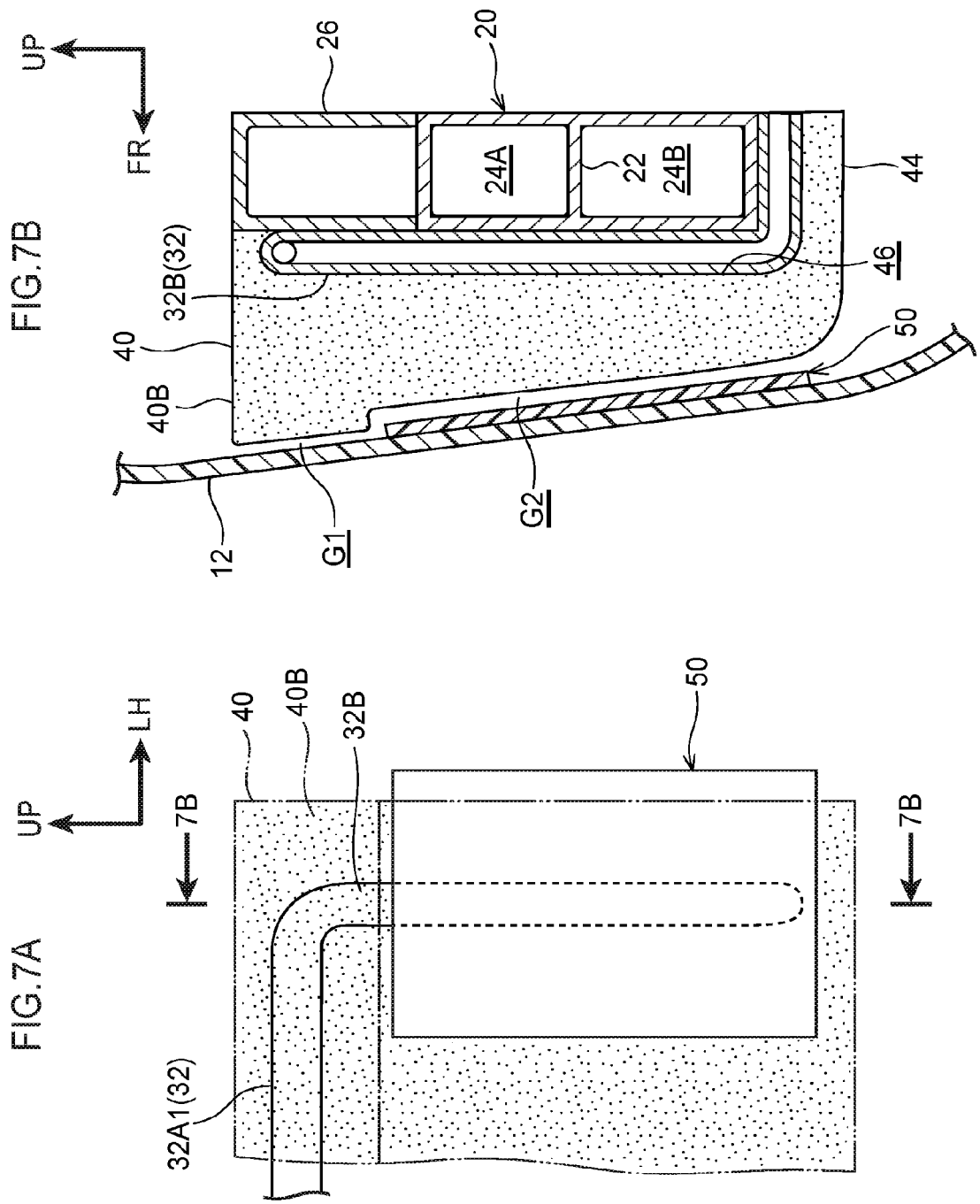

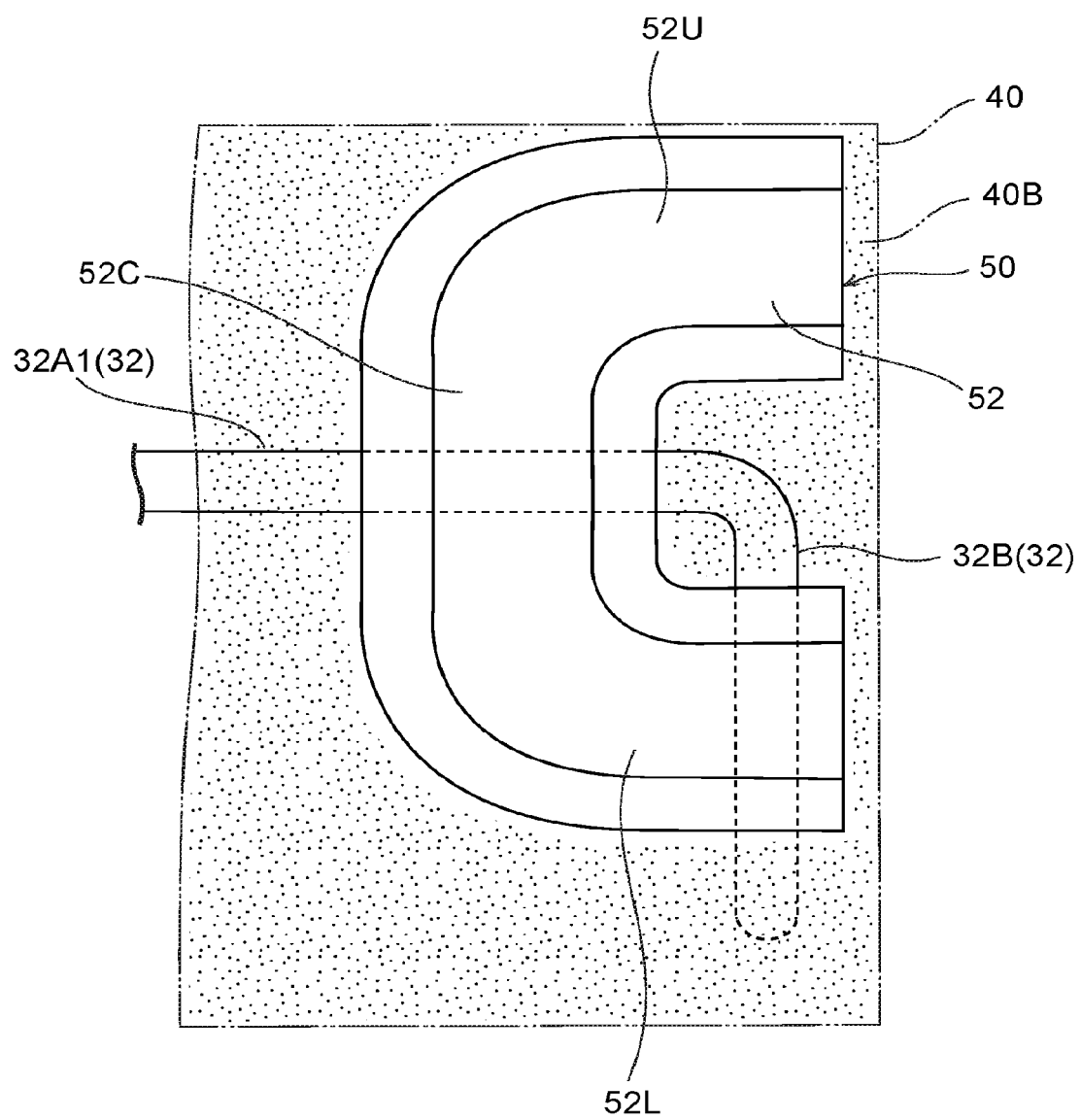

PEDESTRIAN COLLISION DETECTION SENSOR-EQUIPPED VEHICLE BUMPER STRUCTURE

CROSS-REFERENCE TO RELATED APPLICATION

This application is based on and claims priority under 35 USC 119 from Japanese Patent Application No. 2015-157960 filed on Aug. 10, 2015, the disclosure of which is incorporated by reference herein.

BACKGROUND

Technical Field

The present invention relates to a pedestrian collision detection sensor-equipped vehicle bumper structure.

Related Art

In a pedestrian collision detection sensor-equipped vehicle bumper structure described in Japanese National-Phase Publication No. 2014-505629, an absorber is disposed adjacent to a vehicle front side of bumper reinforcement. A groove portion open toward the vehicle rear side is formed in the absorber, and a pressure tube is retained inside the groove portion. In a collision between the vehicle and a colliding body, the absorber presses the pressure tube due to collision load toward the vehicle rear side, and the pressure tube is deformed. Pressure sensors provided at both length direction end portions of the pressure tube accordingly output signals according to a change in pressure in the pressure tube, and an ECU determines whether or not the body colliding with the vehicle is a pedestrian. Note that Japanese Patent Application Laid-Open (JP-A) No. 2012-056452 also describes a pedestrian collision detection sensor-equipped vehicle bumper structure.

However, there is room for improvement of the above pedestrian collision detection sensor-equipped vehicle bumper structures regarding the below points. Namely, in cases in which a colliding body has hit a bumper cover further toward the vehicle width direction outside than the bumper reinforcement, for example, there is a possibility that bending of the bumper cover originates in the vicinity of a vehicle width direction outside end of the bumper reinforcement, and so collision load input to the pressure tube is reduced. In such cases, good pressing of the pressure tube cannot be achieved. Thus, it is desirable to provide a pedestrian collision detection sensor-equipped vehicle bumper structure that has a structure in which good pressing of the pressure tube can be achieved in a collision at a vehicle width direction outside portion of the bumper cover.

SUMMARY

In consideration of the above circumstances, an object of the present invention is to provide a pedestrian collision detection sensor-equipped vehicle bumper structure in which good pressing of a pressure tube can be achieved in a collision at a vehicle width direction outside portion of a bumper cover.

A pedestrian collision detection sensor-equipped vehicle bumper structure according to a first aspect of the present invention includes: bumper reinforcement that is disposed with a length direction along a vehicle width direction at a vehicle front-rear direction inside of a bumper cover provided at a front-rear direction outside end of a vehicle; an absorber that is disposed adjacent to the vehicle front-rear direction outside of the bumper reinforcement and that extends along the vehicle width direction; a pedestrian collision detection sensor that is configured including a pressure tube extending along the vehicle width direction between the bumper reinforcement and the absorber, bending toward a vehicle lower side at positions of both vehicle width direction end portions of the bumper reinforcement, and including a left and right pair of tube end portions extending along a vehicle up-down direction, and that outputs a signal according to a change in pressure in the pressure tube; and a reinforcement member that is provided to a vehicle front-rear direction inside face of the bumper cover, that reinforces the bumper cover, and that is disposed in a position superimposed in the vehicle front-rear direction on the tube end portion in plan view.

In the above configuration, the bumper cover is provided at a front-rear direction outside end of the vehicle (namely, a vehicle front end, or a vehicle rear end) The bumper reinforcement is disposed with its length direction along the vehicle width direction at the vehicle front-rear direction inside of the bumper cover (this being the vehicle rear side of a bumper cover provided at the vehicle front end, or the vehicle front side of a bumper cover provided at the vehicle rear end). The absorber is disposed extending along the vehicle width direction adjacent to, and at the vehicle front-rear direction outside of, the bumper reinforcement. The pressure tube is disposed extending along the vehicle width direction between the bumper reinforcement and the absorber. Both the length direction end portions of the pressure tube configure the tube end portions, and the tube end portions bend toward the vehicle lower side and extend along the vehicle up-down direction at the positions of respective vehicle width direction end portions of the bumper reinforcement.

In a collision between the vehicle (bumper cover) and a colliding body such as a pedestrian, collision load toward the vehicle front-rear direction inside is input from the bumper cover to the absorber, and that pressure tube is pressed by the absorber. The pressure tube is deformed accordingly, and a signal is output from the pedestrian collision detection sensor according to the change in pressure in the pressure tube.

The reinforcement member that reinforces the bumper cover is provided at the vehicle front-rear direction inside face of the bumper cover, and the reinforcement member is disposed in a position superimposed in the vehicle front-rear direction on the tube end portion in plan view. Thus, the portion of the bumper cover that is positioned at the front side of the tube end portion is reinforced by the reinforcement member. Thus, in cases in which a colliding body has hit the bumper cover further toward the vehicle width direction outside than the bumper reinforcement, bending originating at the vehicle width direction outside portion of the bumper cover is suppressed. The collision load is accordingly input to a vehicle width direction outside end portion of the absorber through the bumper cover, enabling good pressing of the pressure tube (tube end portion) to be achieved by the absorber.

A pedestrian collision detection sensor-equipped vehicle bumper structure according to a second aspect of the present invention is the first aspect, wherein the reinforcement member is superimposed on the tube end portion viewed from the vehicle front-rear direction outside.

In the above configuration, in cases in which a colliding body has hit the bumper cover further toward the vehicle width direction outside than the bumper reinforcement, collision load can be input to the vehicle width direction outside end portion of the absorber through the reinforcement member. This enables good pressing of the pressure tube (tube end portion) by the absorber.

A pedestrian collision detection sensor-equipped vehicle bumper structure according to a third aspect of the present invention is the second aspect, wherein a portion of the pressure tube that couples together upper end portions of the left and right pair of tube end portions configures a tube main body portion, and an upper end of the reinforcement member is disposed further toward the vehicle lower side than both vehicle width direction end portions of the tube main body portion.

The above configuration enables the output value from a pressure sensor to be increased when, for example, a pedestrian has collided with the bumper cover at the position of the tube end portion. Namely, when a pedestrian has collided with the bumper cover, the pedestrian tends to fall toward the vehicle side. Thus, mainly collision load diagonally toward the vehicle front-rear direction inside and lower side tends to act on an upper portion of the absorber from the bumper cover. Note that the upper end of the reinforcement member is disposed further toward the vehicle lower side than the tube end portion. This enables the upper portion of the absorber to be directly pressed by the bumper cover. This enables the collision load to be efficiently input to the upper portion of the absorber, and enables an upper end portion of the tube end portion to be effectively pressed by the absorber. This enables the output value from the pressure sensor to be increased.

A pedestrian collision detection sensor-equipped vehicle bumper structure according to a fourth aspect of the present invention is the third aspect, wherein a lower end of the reinforcement member is disposed further toward the lower side than a lower face of the bumper reinforcement The above configuration enables an increased difference in pressure on the pressure tube between when a colliding body other than a pedestrian (for example, a roadside obstacle such as a roadside marker or a guide post) has collided with the bumper cover, and when a pedestrian has collided with the bumper cover, at the position of the tube end portion. Namely, when a colliding body such as a roadside obstacle collides with the bumper cover, the colliding body intrudes toward the vehicle front-rear direction inside of the vehicle, such that mainly collision load toward the vehicle front-rear direction inside acts on the bumper cover. When this occurs, the location of the bumper cover where the colliding body collides is reinforced by the reinforcement member, thereby enabling collision load input from the bumper cover to the absorber to be reduced. This enables an increased difference in pressure on the pressure tube between when a colliding body such as a roadside obstacle has collided with the bumper cover, and when a pedestrian has collided with the bumper cover, at the position of the tube end portion.

A pedestrian collision detection sensor-equipped vehicle bumper structure according to a fifth aspect of the present invention is any one of the first aspect to the fourth aspect, wherein the reinforcement member is configured of a resin or a metal, and is formed in a plate shape with a plate thickness direction along the vehicle front-rear direction.

The above aspect enables good pressing of the pressure tube in a collision at the vehicle width direction outside portion of the bumper cover, while reinforcing the bumper cover using a simple configuration.

A pedestrian collision detection sensor-equipped vehicle bumper structure according to a sixth aspect of the present invention is the fifth aspect, wherein the reinforcement member is formed with a bead portion projecting out toward the vehicle front-rear direction inside, and at least a portion of the bead portion extends along the vehicle width direction.

The above configuration enables the bending rigidity of the reinforcement member to be suitably adjusted using the bead portion. This enables good pressing of the pressure tube in a collision at the vehicle width direction outside portion of the bumper cover according to each vehicle type.

The pedestrian collision detection sensor-equipped vehicle bumper structures according to the first and second aspects of the present invention enable good pressing of the pressure tube in a collision at the vehicle width direction outside portion of the bumper cover.

The pedestrian collision detection sensor-equipped vehicle bumper structure according to the third aspect of the present invention enables good pressing of the upper end portion of the tube end portion when a pedestrian has collided with the bumper cover at the position of the tube end portion The pedestrian collision detection sensor-equipped vehicle bumper structure according to the fourth aspect of the present invention enables an increased difference in pressure on the pressure tube between when a colliding body such as a roadside obstacle has collided with the bumper cover, and when a pedestrian has collided with the bumper cover, at the position of the tube end portion.

The pedestrian collision detection sensor-equipped vehicle bumper structure according to the fifth aspect of the present invention enables good pressing of the pressure tube in a collision at the vehicle width direction outside portion of the bumper cover, while reinforcing the bumper cover using a simple configuration.

The pedestrian collision detection sensor-equipped vehicle bumper structure according to the sixth aspect of the present invention enables good pressing of the pressure tube in a collision at the vehicle width direction outside portion of the bumper cover according to each vehicle type.

BRIEF DESCRIPTION OF THE DRAWINGS

Exemplary embodiments of the present invention will be described in detail based on the following figures, wherein:

FIG. 5 is a front view of the reinforcement plate illustrated in FIG. 4, viewed from the vehicle front side;

FIG. 6A is a front view illustrating a reinforcement plate of variation 1;

FIG. 6B is a side cross-section (a cross-section along line 6B-6B in FIG. 6A) of a position of the tube end portion illustrated in FIG. 6A, viewed from the vehicle left side;

FIG. 7A is a front view illustrating a reinforcement plate of variation 2;

FIG. 7B is a side cross-section (a cross-section along line 7B-7B in FIG. 7A) of a position of the tube end portion illustrated in FIG. 7A, viewed from the vehicle left side; and FIG. 8 is a front view illustrating a reinforcement plate of variation 3.

DETAILED DESCRIPTION

Figure 1:
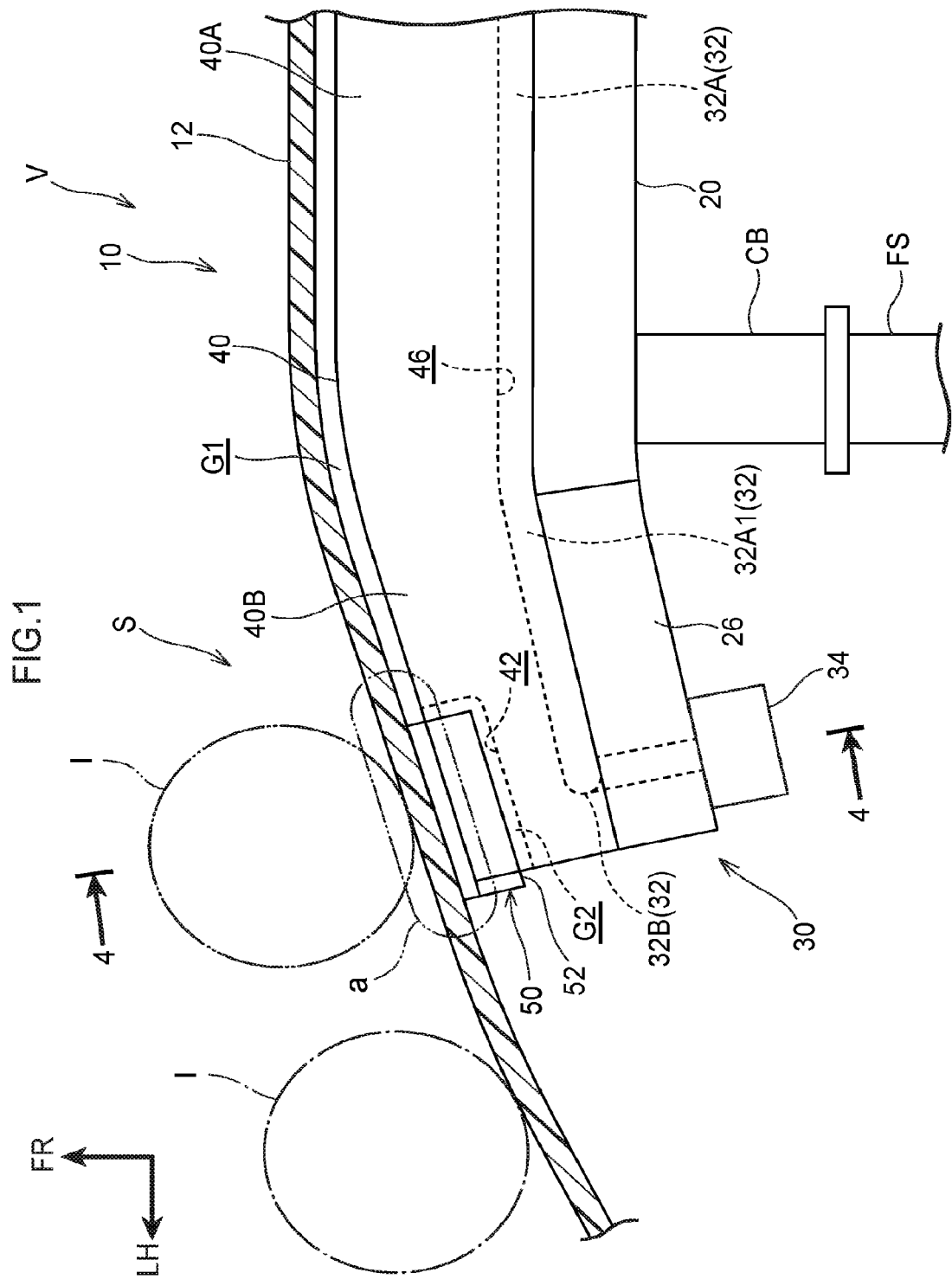
FIG. 1 is a plan view schematically illustrating a partially cut away vehicle width direction left side end portion of a front bumper applied with a pedestrian collision detection sensor-equipped vehicle bumper structure according to an exemplary embodiment.

Explanation follows regarding a front bumper 10 of a vehicle (automobile) V applied with a pedestrian collision detection sensor-equipped vehicle bumper structure S according to an exemplary embodiment. In the drawings, the arrow FR indicates the vehicle front side, the arrow LH indicates the vehicle left side (one vehicle width direction side), and the arrow UP indicates the vehicle upper side, as appropriate. Unless specifically stated otherwise, simple reference to the front-rear, up-down, and left-right directions in the below explanation refers to front and rear in the vehicle front-rear direction, up and down in the vehicle up-down direction, and the left and right of the vehicle (when facing forward).

Figure 2:
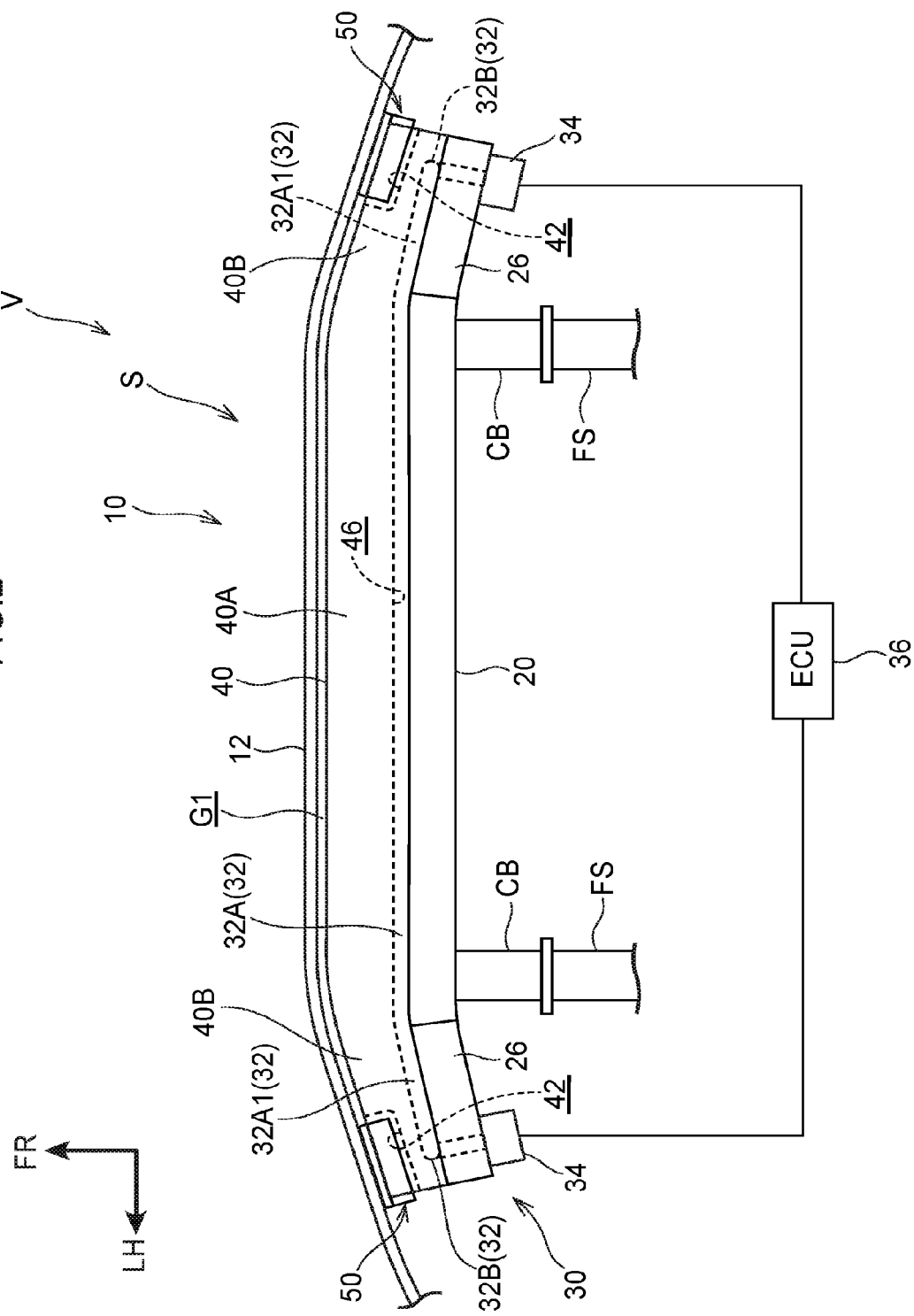
FIG. 2 is a plan view schematically illustrating the entire front bumper illustrated in FIG. 1.

As illustrated in FIG. 2, the front bumper 10 is disposed at a front end section of the vehicle V. Thus, in the present exemplary embodiment, "front side" refers to the "vehicle front-rear direction outside" of the present invention, and "rear side" refers to the "vehicle front-rear direction inside" of the present invention. The front bumper 10 is configured including a bumper cover 12 configuring a front end of the vehicle V, and bumper reinforcement 20 forming a bumper frame member. The front bumper 10 also includes a pedestrian collision detection sensor 30 for detecting a collision between the vehicle V and a colliding body, and an absorber 40 disposed between the bumper cover 12 and the bumper reinforcement 20. The front bumper 10 further includes reinforcement plates 50, serving as a left and right pair of "reinforcement members" that reinforce vehicle width direction outside portions of the bumper cover 12. Explanation follows regarding configuration of each of the above.

Bumper Cover 12

The bumper cover 12 is made of resin. The bumper cover 12 is disposed at the front end of the vehicle V, extends along the vehicle width direction, and is supported by being fixed to the vehicle body at a section not illustrated in the drawings. The vehicle width direction outside portions of the bumper cover 12 slope toward the rear side on progression toward the vehicle width direction outside in plan view.

Bumper Reinforcement 20

Figure 3:
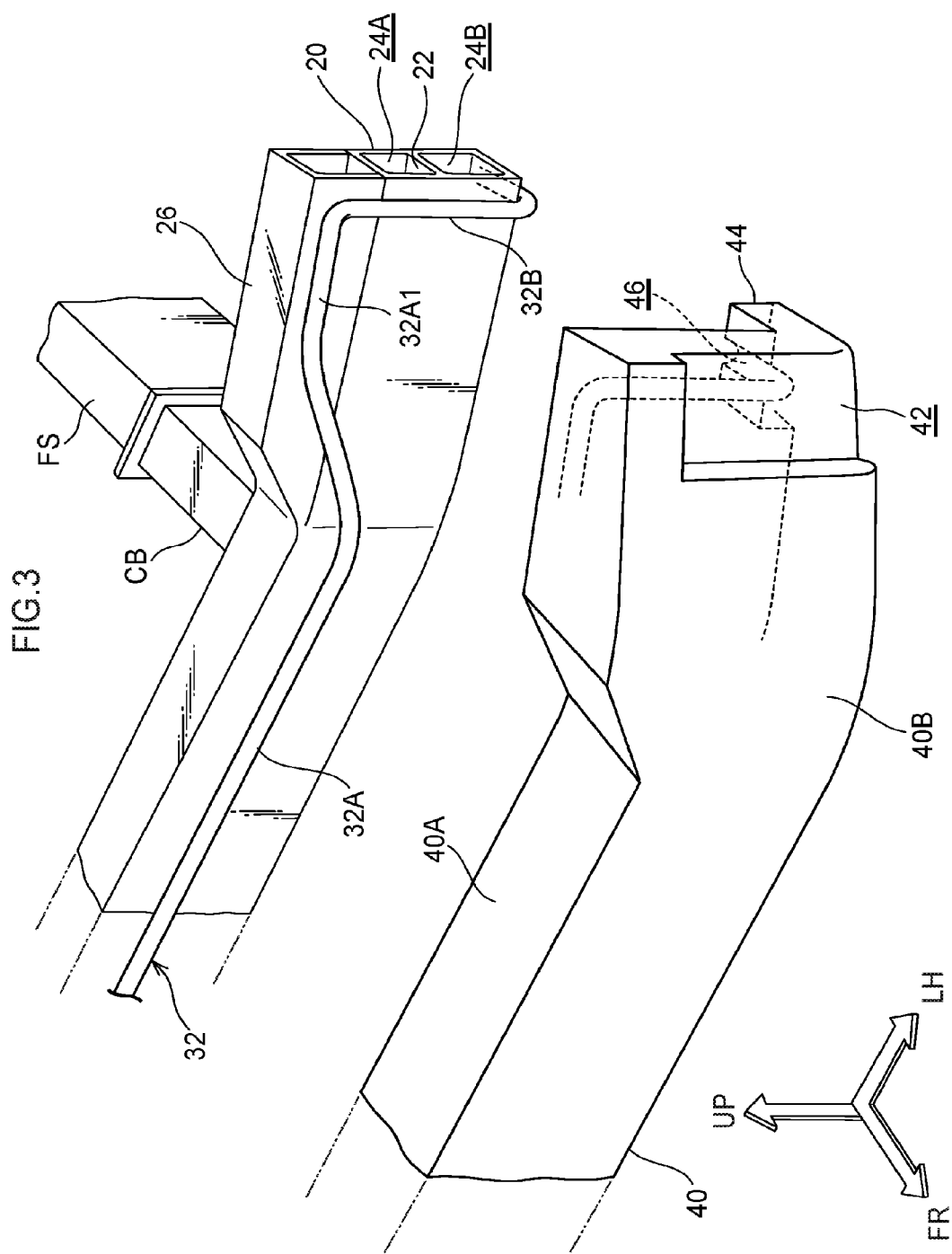
FIG. 3 is an exploded perspective view schematically illustrating a state in which the absorber has been disassembled from the bumper reinforcement illustrated in FIG. 1, viewed diagonally from the vehicle front left.
Figure 4:
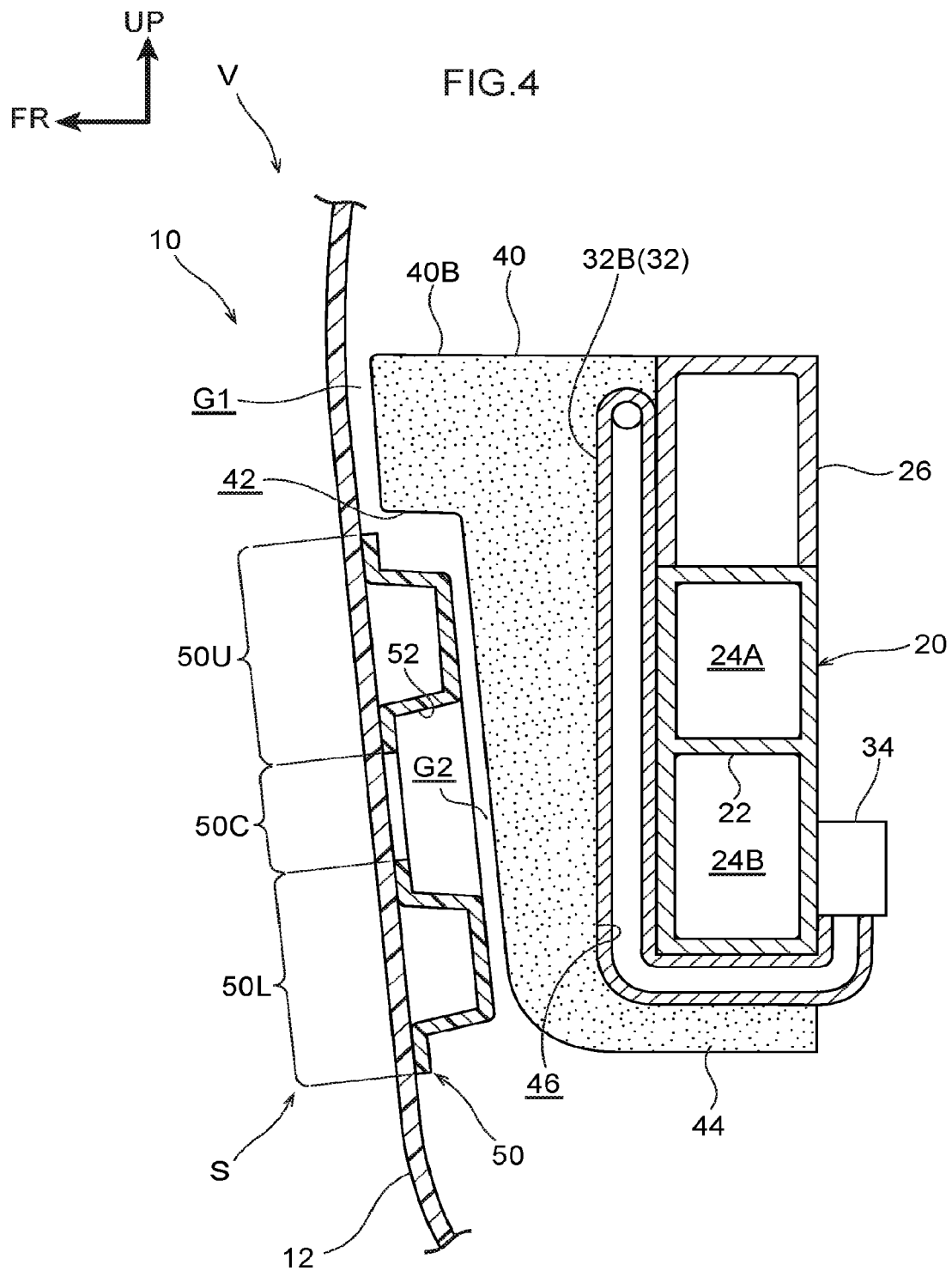
FIG. 4 is a side cross-section (an enlarged cross-section along line 4-4 in FIG. 1) of a position of a tube end portion of the front bumper illustrated in FIG. 1, viewed from the vehicle left side.

The bumper reinforcement 20 is formed in a hollow, substantially rectangular column shape, and is disposed with its length direction running along the vehicle width direction. The bumper reinforcement 20 is configured, for example, by an aluminum-based metal material, and is manufactured by a method such as extrusion forming. As illustrated in FIGS. 3 and 4, a plate shaped reinforcement portion 22 is provided inside the bumper reinforcement 20. The reinforcement portion 22 is disposed with its plate thickness direction running along the up-down direction, and couples together a front wall and a rear wall of the bumper reinforcement 20. A cross-section structure of the bumper reinforcement 20 configures a cross-section structure in which plural (two in the present exemplary embodiment) substantially rectangular shaped closed cross-sections are side-by-side in the up-down direction. Namely, in the present exemplary embodiment, the reinforcement portion 22 is provided at one location inside the bumper reinforcement 20. The closed cross-section disposed at an upper portion of the bumper reinforcement 20 configures an upper side closed cross-section 24A, and the closed cross-section disposed at a lower portion of the bumper reinforcement 20 configures a lower side closed cross-section 24B.

A bracket 26 is integrally provided to an upper face of the bumper reinforcement 20 at either vehicle width direction end portion thereof. Configuration is such that the height at either vehicle width direction end portion of the bumper reinforcement 20 is increased toward the upper side by the bracket 26. Each bracket 26 is formed in substantially a U-shape open toward the lower side viewed from the length direction outside of the bumper reinforcement 20. A lower end of the bracket 26 is joined to the upper face of the bumper reinforcement 20 in a state in which a front face of the bracket 26 and a front face of the bumper reinforcement 20 are disposed in the same plane as each other. A vehicle width direction center side portion of an upper face of the bracket 26 configures a sloped face sloping toward the lower side on progression toward the vehicle width direction center side in vehicle front view, and a vehicle width direction center side end of the bracket 26 is connected to the upper face of the bumper reinforcement 20 (see FIG. 3).

As illustrated in FIG. 2, a left and right pair front side members FS, configuring frame members at the vehicle body side, extend along the front-rear direction at the rear side of the bumper reinforcement 20. A side portion at either vehicle width direction end of the bumper reinforcement 20 is coupled to a front end of the respective front side member FS through a crash box CB. Vehicle width direction outside portions of the bumper reinforcement 20 slope toward the rear side on progression toward the vehicle width direction outside in plan view, corresponding to the bumper cover 12.

Pedestrian Collision Detection Sensor 30

As illustrated in FIG. 2, the pedestrian collision detection sensor 30 is configured including a pressure tube 32 formed in an elongated shape, and a left and right pair of pressure sensors 34 (elements broadly understood to be "pressure detectors") that output signals according to a change in pressure in the pressure tube 32.

As illustrated in FIGS. 3 and 4, the pressure tube 32 is configured as a hollow structural body with a substantially circular ring shaped cross-section using a silicon tube or the like. The pressure tube 32 has the same cross-section profile across the length direction of the pressure tube 32. As illustrated in FIG. 3, the pressure tube 32 is configured including a tube main body portion 32A configuring a length direction intermediate portion of the pressure tube 32, and tube end portions 32B configuring respective length direction end portions of the pressure tube 32. The tube main body portion 32A is disposed adjacent to the front face of the upper portion of the bumper reinforcement 20 (specifically, the front face of the portion configuring the upper side closed cross-section 24A), and extends along the vehicle width direction. Either vehicle width direction end portion of the tube main body portion 32A bends in substantially a crank shape toward the upper side in a front view, and is disposed adjacent to the front face of the respective bracket 26. The portion that is bent in substantially a crank shape configures a tube main body side portion 32A1. The tube main body side portion 32A1 bends toward the upper side so as to run alongside the upper face of the bracket 26 in a front view, and is disposed adjacent to the front face of the bracket 26. Namely, in vehicle front view, a vehicle width direction center side portion of the tube main body side portion 32A1 is sloped toward the lower side on progression toward the vehicle width direction center side, and a vehicle width direction outside portion of the tube main body side portion 32A1 extends along the vehicle width direction.

Each tube end portion 32B extends toward the lower side from a vehicle width direction outside end portion of the respective tube main body side portion 32A1, and extends along the up-down direction. Specifically, the tube end portion 32B is adjacent to the front face of the bumper reinforcement 20 at a position in close proximity to a vehicle width direction outside end of the bumper reinforcement 20. A lower end portion of the tube end portion 32B bends toward the rear side at a lower end of the front face of the bumper reinforcement 20, and extends in the front-rear direction along a lower face of the bumper reinforcement 20. A leading end portion of the tube end portion 32B projects out toward the rear side with respect to a rear face of the bumper reinforcement 20.

As illustrated in FIGS. 2 and 4, the pressure sensors 34 are provided at respective length direction ends of the pressure tube 32, and are fixed to a vehicle body member of the vehicle V (the rear face of the bumper reinforcement 20 in the present exemplary embodiment). Note that fixing positions of the pressure sensors 34 may be set as desired according to each vehicle type. As illustrated in FIG. 2, the pressure sensors 34 are electrically connected to an ECU 36 (an element broadly understood to be a "collision determination section") Signals are output from the pressure sensors 34 to the ECU 36 according to the change in pressure inside the pressure tube 32 when the pressure tube 32 deforms.

A collision speed sensor (not illustrated in the drawings) is also electrically connected to the ECU 36 described above, and the collision speed sensor outputs a signal according to collision speed with a colliding body to the ECU 36. The ECU 36 then computes the collision load based on the output signals of the pressure sensors 34 described above, and computes the collision speed based on the output signal of the collision speed sensor. The ECU 36 then derives an effective mass of the colliding body from the computed collision load and collision speed, determines whether or not the effective mass exceeds a threshold value, and determines whether the body colliding with the front bumper 10 is a pedestrian, or an object other than a pedestrian (for example, a roadside obstacle such as a roadside marker or a guide post).

Absorber 40

As illustrated in FIGS. 2 to 4, the absorber 40 is configured of a foamed resin material, namely urethane foam or the like The absorber 40 is disposed between the bumper cover 12 and the bumper reinforcement 20, and is disposed adjacent to the front side of the bumper reinforcement 20. The absorber 40 is formed in an elongated shape with its length direction running along the vehicle width direction so as to run alongside the bumper cover 12 and the bumper reinforcement 20 in plan view, and the vehicle width direction positions of vehicle width direction outside ends of the absorber 40 are substantially aligned with the vehicle width direction positions of the vehicle width direction outside ends of the bumper reinforcement 20

A portion configuring a vehicle width direction intermediate portion of the absorber 40 configures an absorber center portion 40A, and portions configuring respective vehicle width direction end portions of the absorber 40 (specifically, portions disposed at the front side of portions of the bumper reinforcement 20 that are provided with the brackets 26) configure absorber side portions 40B. An upper face of the absorber 40 is disposed so as to be aligned with the upper face of the bumper reinforcement 20 in the up-down direction. Namely, upper portions of the absorber side portions 40B project out further toward the upper side than the absorber center portion 40A.

In cross-section view viewed from the length direction, the absorber 40 is formed in a substantially rectangular shape with its length direction along the up-down direction. A gap G1 is configured between a front face of the absorber 40 and a rear face of the bumper cover 12 so as to be substantially uniform along the up-down direction. A recessed portion 42 for disposing the respective reinforcement plate 50, described later, is formed in a front face of a vehicle width direction outside end portion of each absorber side portion 40B. The recessed portion 42 is open toward the lower side and the vehicle width direction outside. An absorber side lower portion 44 is formed projecting out toward the rear side at a lower end portion of each absorber side portion 40B. The absorber side lower portion 44 is disposed adjacent to the lower face of the bumper reinforcement 20.

A retaining groove 46 for retaining the pressure tube 32 is formed in a rear face of the absorber 40 and an upper face of each absorber side lower portion 44. The retaining groove 46 is formed in a position corresponding to the pressure tube 32. Namely, the retaining groove 46 extends along the vehicle width direction, and bends toward the lower side at the vehicle width direction end portions of the absorber 40. The portion of the retaining groove 46 that bends toward the lower side is connected to the portion of the retaining groove 46 formed to the upper face of the absorber side lower portion 44. The retaining groove 46 is formed in substantially a U-shape open toward the rear side in side cross-section view, and is formed with the same shape across the length direction of the retaining groove 46. The pressure tube 32 is inserted and retained inside the retaining groove 46. In other words, the tube main body portion 32A (a portion excluding the tube main body side portions 32A1) is retained by the portion of the retaining groove 46 formed to the absorber center portion 40A, and the tube end portions 32B are retained by the portions of the retaining groove 46 formed to the absorber side portions 40B.

Reinforcement Plates 50

Explanation follows regarding the reinforcement plates 50, these being a relevant portion of the present invention. As illustrated in FIGS. 4 and 5, each reinforcement plate 50 is configured of a plate made of resin or metal, and is set (fixed) to the rear face at the respective vehicle width direction side portion of the bumper cover 12 with its plate thickness direction along the front-rear direction. As illustrated in FIG. 5, the reinforcement plate 50 is formed in substantially a U-shape open toward the vehicle width direction outside in vehicle front view. Specifically the reinforcement plate 50 is configured including an upper plate portion 50U configuring an upper end portion of the reinforcement plate 50, a lower plate portion 50L configuring a lower end portion of the reinforcement plate 50, and a center plate portion 50C that vertically couples together vehicle width direction center side portions of the upper plate portion 50U and the lower plate portion 50L. A vehicle width direction center side portion of the reinforcement plate 50 accordingly extends continuously along the up-down direction.

The abovementioned vehicle width direction center side portion of the reinforcement plate 50 is disposed in a position superimposed on the respective tube end portion 32B in vehicle front view. A vehicle width direction outside end portion of the reinforcement plate 50 projects out further toward the vehicle width direction outside than the vehicle width direction outside end of the absorber 40 (bumper reinforcement 20). The reinforcement plate 50 is thereby disposed in a position superimposed on the respective tube end portion 32B in the front-rear direction in plan view (see FIGS. 1 and 2).

An upper end of the reinforcement plate 50 is disposed further toward the lower side than the vehicle width direction end portion of the respective tube main body portion 32A (tube main body side portion 32A1) in vehicle front view. A lower end of the reinforcement plate 50 is disposed further toward the lower side than a lower end of the respective absorber side portion 40B. In other words, the lower end of the reinforcement plate 50 is disposed further to the lower side than the lower face of the bumper reinforcement 20. A portion of the reinforcement plate 50 is accordingly disposed superimposed on the respective tube end portion 32B, excluding the upper end portion thereof, which is disposed adjacent to the front face of the bumper reinforcement 20, in vehicle front view. The vehicle width direction outside portion of the bumper cover 12 (specifically, a portion positioned at the front side of the tube end portion 32B (the vehicle width direction outside end of the bumper reinforcement 20)) is reinforced by the reinforcement plate 50.

As illustrated in FIG. 5, a bead portion 52 is formed to the reinforcement plate 50. The bead portion 52 is formed along the length direction of the reinforcement plate 50, and is disposed at a width direction center portion of the reinforcement plate 50 viewed from the length direction of the reinforcement plate 50. Namely, the bead portion 52 is also formed in substantially a U-shape open toward the vehicle width direction outside in vehicle front view. The bead portion 52 projects out toward the rear side, and is formed in substantially a U-shape in cross-section view viewed from the length direction of the reinforcement plate 50. Thus, portions of the bead portion 52 respectively formed to both the upper plate portion 50U and the lower plate portion 50L extend along the vehicle width direction, and are disposed vertically side-by side in side cross-section view. The reinforcement plate 50 is disposed so as to be housed inside the above-described recessed portion 42 of the absorber 40, and is set such that a distance between the reinforcement plate 50 (bead portion 52) and a bottom face of the recessed portion 42 in the front-rear direction, and a distance between the bumper cover 12 and the absorber 40 in the front-rear direction, are substantially uniform. Namely, a gap G2 between the reinforcement plate 50 and the absorber 40 is configured so as to be substantially the same as the gap G1 between the bumper cover 12 and the absorber 40.

Explanation follows regarding operation and advantageous effects of the present exemplary embodiment.

In a collision between the vehicle V (front bumper 10) and a colliding body, the bumper cover 12 is pressed toward the rear side by the colliding body. The bumper cover 12 thereby presses the absorber 40 toward the rear side, and collision load toward the rear side is input from the bumper cover 12 to the absorber 40. Thus the absorber 40 presses the pressure tube 32 while undergoing plastic deformation, and the pressure tube 32 is deformed. The pressure inside the pressure tube 32 changes as a result.

When the pressure inside the pressure tube 32 changes, the pressure sensors 34 output signals corresponding to the pressure change in the pressure tube 32 to the ECU 36, and the ECU 36 computes the collision load based on the output signals from the pressure sensors 34. The ECU 36 also computes the collision speed based on the output signal from the collision speed sensor. The ECU 36 then derives the effective mass of the colliding body from the computed collision load and collision speed, determines whether or not the effective mass exceeds the threshold value, and thereby determines whether or not the body colliding with the front bumper 10 is a pedestrian.

Note that the reinforcement plates 50 that reinforce the bumper cover 12 are provided at the rear face of the bumper cover 12, and the reinforcement plates 50 are disposed in positions superimposed in the front-rear direction on the respective tube end portions 32B of the pressure tube 32 in plan view. Thus, each vehicle width direction outside portion of the bumper cover 12 (the portion positioned at the front side of the respective tube end portion 32B (the vehicle width direction outside end of the bumper reinforcement 20), and illustrated as portion a in FIG. 1) is reinforced by the reinforcement plate 50. Thus, when a colliding body I (see the colliding body I illustrated by a single-dotted dashed line in FIG. 1) has hit the bumper cover 12 further toward the vehicle width direction outside than the bumper reinforcement 20, bending originating at the portion a of the bumper cover 12 is suppressed. Collision load toward the rear side is thereby input from the colliding body I to the vehicle width direction outside end portion of the absorber 40 through the bumper cover 12, enabling good pressing of the pressure tube 32 (tube end portion 32B) by the absorber 40.

Specific explanation follows regarding this point. Namely, in cases in which the colliding body I has hit the bumper cover 12 further toward the vehicle width direction outside than the bumper reinforcement 20, collision load toward the vehicle rear side is input further toward the vehicle width direction outside than the portion a of the bumper cover 12, and the bumper cover 12 is displaced toward the rear side. When this occurs, a reaction force from the bumper reinforcement 20 toward the front side acts on the bumper cover 12 through the absorber 40, such that displacement of a portion of the bumper cover 12 further toward the vehicle width direction inside than the portion a is suppressed, and mainly a portion of the bumper cover 12 further toward the vehicle width direction outside than the portion a is displaced toward the rear side. In a hypothetical case in which the reinforcement plate 50 is not provided to the bumper cover 12, there would accordingly be a concern that the bumper cover 12 bends originating in the vicinity of the portion a. In such a case, collision load toward the rear side input from the colliding body I to the vehicle width direction outside end portion of the absorber 40 would be reduced, and there would be a possibility that good pressing of the pressure tube 32 (tube end portion 32B) might not be achieved by the absorber In contrast thereto, in the present exemplary embodiment, each reinforcement plate 50 is provided to the rear face of the bumper cover 12, and the reinforcement plate 50 is disposed in a position superimposed in the front-rear direction on the respective tube end portion 32B in plan view. The bending rigidity of a portion (portion a) of the bumper cover 12 at the front side of the tube end portion 32B is thereby increased. Thus, as described above, in cases in which a colliding body I has hit the bumper cover 12 further toward the vehicle width direction outside than the bumper reinforcement 20, the bumper cover 12 is suppressed from bending originating in the vicinity of the portion a. Thus collision load toward the rear side input to the bumper cover 12 is efficiently input to the vehicle width direction outside end portion of the absorber 40, enabling good pressing of the pressure tube 32 (tube end portion 32B) by the absorber 40, and enabling the output value from the pressure sensors 34 to be increased.

When a pedestrian has collided with the bumper cover 12, mainly the legs of the pedestrian hit the bumper cover 12, such that the pedestrian tends to fall toward the vehicle V side (specifically, onto the hood of the vehicle V). Thus operation is such that, when a pedestrian (see the colliding body I illustrated by the double-dotted dashed line in FIG. 1) has collided with the bumper cover 12 at a position at the front side of the tube end portion 32B, the pedestrian falls onto the hood of the vehicle V along the extension direction (up-down direction) of the tube end portion 32B, while pressing the tube end portion 32B through the bumper cover 12 and the absorber 40. As described above, the bending rigidity of the portion (portion a) of the bumper cover 12 at the front side of the tube end portion 32B is increased by the reinforcement plate 50, thereby enabling good pressing of the tube end portion 32B accompanying the pedestrian falling (moving) toward the vehicle V side.

Viewed from the vehicle front-rear direction, the reinforcement plate 50 is superimposed on the respective tube end portion 32B. Thus, when a colliding body I has hit the bumper cover 12 further toward the vehicle width direction outside than the bumper reinforcement 20, collision load toward the rear side is input through the reinforcement plate 50 to the vehicle width direction outside end portion of the absorber 40 (absorber side portion 40B) that retains the tube end portion 32B. This further enables good pressing of the tube end portion 32B by the absorber 40 (absorber side portion 40B).

The upper end of the reinforcement plate 50 is disposed further toward the lower side than the respective vehicle width direction end portion (tube main body side portion 32A1) of the tube main body portion 32A. Namely, the upper end of the reinforcement plate 50 is disposed further toward the lower side than the upper end portion of the tube end portion 32B. This enables the pressure tube 32 (tube end portion 32B) to be pressed effectively when a pedestrian (see the double-dotted dashed line in FIG. 1) has collided with the bumper cover 12 at a position at the front side of the tube end portion 32B. Namely, as described above, when (the legs of) a pedestrian has collided with the bumper cover 12, the pedestrian tends to fall onto the vehicle V side (specifically, onto the hood of the vehicle V), such that mainly collision load diagonally toward the lower rear side acts on an upper portion of the bumper cover 12. As described above, the upper end of the reinforcement plate 50 is disposed further toward the lower side than the tube main body side portion 32A1. This enables an upper portion of the absorber 40 to be directly pressed by the bumper cover 12 due to the collision load diagonally toward the lower rear side. This enables collision load to be efficiently input to the upper portion of the absorber 40, and an upper end portion of the tube end portion 32B and the tube main body side portion 32A1 to be effectively pressed by the absorber 40.

The lower end of the reinforcement plate 50 is disposed further toward the lower side than the lower end of the bumper reinforcement 20. This enables an increased difference in pressure on the pressure tube 32 between when a colliding body I other than a pedestrian (for example, a roadside obstacle such as a roadside marker or a guide post, see the colliding body I illustrated by the double-dotted dashed line in FIG. 1) has collided with the bumper cover 12, and when a pedestrian has collided with the bumper cover 12, at the position of the tube end portion 32B. Namely, when a colliding body I such as a roadside obstacle has collided with the bumper cover 12, the colliding body I intrudes toward the vehicle rear side of the vehicle V. Thus, mainly collision load toward the rear side acts on the bumper cover 12. When this occurs, since the reinforcement plate 50 is provided at the collision location of the bumper cover 12, the bumper cover 12 is reinforced by the reinforcement plate 50, and operation is such that the colliding body I is arrested by the reinforcement plate 50. This enables collision load input from the bumper cover 12 to the absorber 40 to be reduced. This enables an increased difference in pressure on the pressure tube 32 between when a colliding body I such as a roadside obstacle has collided with the bumper cover 12, and when a pedestrian has collided with the bumper cover 12, at the position of the tube end portion 32B. This enables the difference in output values from the pedestrian collision detection sensor 30 to be increased.

Each reinforcement plate 50 is configured of metal or resin, and formed in a plate shape with its plate thickness direction along the front-rear direction. This enables good pressing of the pressure tube 32 (tube end portion 32B) at the vehicle width direction outside portion of the bumper cover 12, while reinforcing the bumper cover 12 using a simple configuration.

The reinforcement plate 50 is formed with the bead portion 52 projecting out toward the rear side, and the portions of the bead portion 52 formed at the upper plate portion 50U and the lower plate portion 50L of the reinforcement plate 50 extend along the vehicle width direction. This enables the bending rigidity of the reinforcement plate 50 in the vehicle width direction to be adjusted as appropriate using the bead portion 52. This enables good pressing of the pressure tube 32 (tube end portion 32B) at the vehicle width direction outside portion of the bumper cover 12, according to each vehicle type Each of the tube main body side portions 32A1, these being the respective vehicle width direction end portions of the tube main body portion 32A of the pressure tube 32, is bent in substantially a crank shape toward the upper side, and is disposed adjacent to the front face of the bracket 26. This enables the tube main body side portion 32A1 to be disposed at the upper side with respect to the tube main body portion 32A. This enables the pressure tube 32 to be still more effectively pressed when a pedestrian has collided with the bumper cover 12 at a position at the front side of the tube main body side portion 32A1 Namely, as described above, when a pedestrian has collided with the bumper cover 12, mainly collision load diagonally toward the lower rear side acts on the upper portion of the bumper cover 12. Thus, it is effective to dispose the tube main body portion 32A further toward the upper side from the perspective of causing the tube main body portion 32A to deform due to the collision load diagonally toward the lower rear side. In the present exemplary embodiment, as described above, each of the tube main body side portions 32A1, these being the vehicle width direction end portions of the tube main body portion 32A, is disposed at the upper side with respect to the tube main body portion 32A. Thus, collision load diagonally toward the lower rear side is efficiently input to the tube main body side portion 32A1 when a pedestrian has collided with the bumper cover 12 at a position at the front side of the tube main body side portion 32A1, thereby enabling the pressure tube 32 to be still more effectively pressed.

Note that in the present exemplary embodiment, each reinforcement plate 50 is formed in substantially a U-shape open toward the vehicle width direction outside in vehicle front view, and is disposed superimposed on the tube end portion 32B; however, the shape and position of the reinforcement plate 50 may be changed as appropriate according to each vehicle type. Explanation follows regarding variations in the shape and position of the reinforcement plate 50.

Reinforcement Plate 50 Variation 1

As illustrated in FIGS. 6A and 6B, the reinforcement plate 50 in variation 1 is formed in a substantially rectangular plate shape. The bead portion 52 extends along the vehicle width direction at the upper portion of the reinforcement plate 50. In variation 1, the reinforcement plate 50 is set in the same position as in the present exemplary embodiment. Thus, variation 1 also enables the bumper cover 12 to be reinforced by the reinforcement plate 50 at a position at the front side of the tube end portion 32B. Variation 1 accordingly exhibits similar operation and advantageous effects to those in the present exemplary embodiment.

In variation 1, the bead portion 52 extends along the vehicle width direction at the upper portion of the reinforcement plate 50. Namely, the bead portion 52 is not formed at the lower portion of the reinforcement plate 50. This enables the reinforcement plate 50 to be effectively disposed at the rear face of the bumper cover 12 in vehicles that only have a small gap between the bumper cover 12 and a lower portion of the absorber 40.

Reinforcement Plate 50 Variation 2

As illustrated in FIGS. 7A and 7B, the reinforcement plate 50 in variation 2 is configured similarly to variation 1, excluding the points described below. Namely, the bead portion 52 is omitted from the reinforcement plate 50 in variation 2. Thus, the bending rigidity of the reinforcement plate 50 in variation 2 is less than in variation 1; however, similarly to in variation 1, the reinforcement plate 50 can be effectively disposed at the rear face of the bumper cover 12 in vehicles that only have a small gap between the bumper cover 12 and the lower portion of the absorber 40.

Reinforcement Plate 50 Variation 3

As illustrated in FIG. 8, the reinforcement plate 50 in variation 3 is configured similarly to that in the present exemplary embodiment, excluding the points described below. Namely, in variation 3, the upper plate portion 50U is disposed at the upper side of the pressure tube 32 in vehicle front view, and a vehicle width direction outside portion of the lower plate portion 50L is disposed superimposed on the tube end portion 32B. The center plate portion 50C is disposed at the vehicle width direction center side of the tube end portion 32B in vehicle front view. Namely, the reinforcement plate 50 of variation 3 is larger in size than that in the present exemplary embodiment, and the upper end of the reinforcement plate 50 is disposed further toward the upper side than the pressure tube 32. The reinforcement plate 50 is superimposed on a lower portion of the tube end portion 32B in vehicle front view. Thus the reinforcement plate 50 in variation 3 is also disposed in a position superimposed in the front-rear direction on the tube end portion 32B in plan view. Thus, the bending rigidity of the portion of the bumper cover 12 at the front side of the tube end portion 32B is also increased in variation 3. This enables similar operation and advantageous effects to those in the present exemplary embodiment to be obtained.

Note that in the present exemplary embodiment and variations 1 to 3, the reinforcement plate 50 and a portion (a portion excluding the upper end portion) of the tube end portion 32B are disposed superimposed on each other in vehicle front view; however, the reinforcement plate 50 and the tube end portion 32B may be disposed without being superimposed on each other in vehicle front view. To explain using variation 3, for example, a vehicle width direction outside portion of the lower plate portion 50L of the reinforcement plate 50 may be omitted, and the reinforcement plate 50 may be formed in an inverted, substantially L-shape in vehicle front view. Even in such a case, the reinforcement plate 50 is disposed in a position superimposed in the front-rear direction on the tube end portion 32B in plan view, thereby enabling the bending rigidity of the portion of the bumper cover 12 at the front side of the tube end portion 32B to be increased. This enables good pressing of the pressure tube 32 (tube end portion 32B) when a colliding body I has hit the bumper cover 12 further toward the vehicle width direction outside than the bumper reinforcement 20.

Note that in the present exemplary embodiment and variations 1 to 3, as described above, the reinforcement plate 50 and a portion (a portion excluding the upper end portion) of the tube end portion 32B are disposed superimposed on each other in vehicle front view; however, the reinforcement plate 50 may be disposed so as to be superimposed on the entire tube end portion 32B in vehicle front view. To explain using the present exemplary embodiment and variations 1 and 2, for example, the upper end of the reinforcement plate 50 may be disposed further toward the upper side than the pressure tube 32. Such a case enables the bending rigidity of the reinforcement plate 50 to be higher than in the present exemplary embodiment and variations 1 and 2. This further enables good pressing of the pressure tube 32 (tube end portion 32B) when a colliding body I has hit the bumper cover 12 further toward the vehicle width direction outside than the bumper reinforcement 20.

Note that in cases in which the upper end of the reinforcement plate 50 is disposed further toward the upper side than the pressure tube 32, the upper portion of the absorber 40 cannot be directly pressed by the bumper cover 12. Thus, collision load input to the pressure tube 32 is reduced when a pedestrian has collided with the bumper cover 12 at a position at the front side of the tube end portion 32B; however, it is sufficient as long as the bending rigidity of the reinforcement plate 50 is appropriately adjusted to a degree enabling determination to be made by the ECU 36 that the colliding body I is a pedestrian.

The outer shape (size) of the reinforcement plate 50 in the present exemplary embodiment and variations 1 to 3 may be set as appropriate according to the bending rigidity of the bumper cover 12, and so on, in each vehicle type. For example, the projection amount of the reinforcement plate 50 from the vehicle width direction outside end of the bumper reinforcement 20 toward the vehicle width direction outside in vehicle front view may be adjusted as appropriate in consideration of the bending rigidity of the bumper cover 12, and so on, in each vehicle type.

In the present exemplary embodiment and variations 1 to 3, an example has been described in which the pedestrian collision detection sensor-equipped vehicle bumper structure S is applied to the front bumper 10. However, the present invention is not limited thereto, and for example, the front and rear of the each of the above configurations may be inverted, and the pedestrian collision detection sensor-equipped vehicle bumper structure S may be applied to a rear bumper.

What is claimed is:

1. A pedestrian collision detection sensor-equipped vehicle bumper structure comprising:
   bumper reinforcement that is disposed with a length direction along a vehicle width direction at a vehicle front-rear direction inside of a bumper cover provided at a front-rear direction outside end of a vehicle;
   an absorber that is disposed adjacent to the vehicle front-rear direction outside of the bumper reinforcement and that extends along the vehicle width direction;

a pedestrian collision detection sensor that is configured including a pressure tube extending along the vehicle width direction between the bumper reinforcement and the absorber, bending toward a vehicle lower side at positions of both vehicle width direction end portions of the bumper reinforcement, and including a left and right pair of tube end portions extending along a vehicle up-down direction, and that outputs a signal according to a change in pressure in the pressure tube; and a reinforcement member that is provided to a vehicle front-rear direction inside face of the bumper cover, that reinforces the bumper cover, and that is disposed in a position superimposed in the vehicle front-rear direction on the tube end portion in plan view.

2. The pedestrian collision detection sensor-equipped vehicle bumper structure of claim 1, wherein the reinforcement member is superimposed on the tube end portion viewed from the vehicle front-rear direction outside.

3. The pedestrian collision detection sensor-equipped vehicle bumper structure of claim 2, wherein:

a portion of the pressure tube that couples together upper end portions of the left and right pair of tube end portions configures a tube main body portion; and an upper end of the reinforcement member is disposed further toward the vehicle lower side than both vehicle width direction end portions of the tube main body portion.

4. The pedestrian collision detection sensor-equipped vehicle bumper structure of claim 3, wherein a lower end of the reinforcement member is disposed further toward the lower side than a lower face of the bumper reinforcement.

5. The pedestrian collision detection sensor-equipped vehicle bumper structure of claim 1, wherein the reinforcement member is configured of a resin or a metal, and is formed in a plate shape with a plate thickness direction along the vehicle front-rear direction.

6. The pedestrian collision detection sensor-equipped vehicle bumper structure of claim 5, wherein:

the reinforcement member is formed with a bead portion projecting out toward the vehicle front-rear direction inside; and at least a portion of the bead portion extends along the vehicle width direction.

* * * * *